United States Patent [19]

Steffen et al.

[11] 4,307,390
[45] Dec. 22, 1981

[54] CORN AND SOYBEAN SENSOR

[75] Inventors: David E. Steffen, Chatham; Victor D. Goeckner, Virden, both of Ill.

[73] Assignee: Dickey-john Corporation, Auburn, Ill.

[21] Appl. No.: 91,959

[22] Filed: Nov. 7, 1979

[51] Int. Cl.³ .......................... A01C 7/08; B65G 51/36
[52] U.S. Cl. ........................ 340/684; 111/1;
209/576; 209/586; 221/7; 235/92 PC; 235/92 V; 250/222 PC
[58] Field of Search ............... 340/684; 209/576, 586; 221/2, 7; 222/23; 235/92 PK, 92 PC, 92 V; 250/215, 222 PC; 111/1

[56] References Cited

U.S. PATENT DOCUMENTS

| | | | |
|---|---|---|---|
| 3,390,229 | 6/1968 | Williams | 250/222 PC |
| 3,395,794 | 8/1968 | Petry | 209/586 |
| 3,712,469 | 1/1973 | Dwyer et al. | 209/586 X |
| 3,723,989 | 3/1973 | Fathauer et al. | 340/684 X |
| 3,984,307 | 10/1976 | Kamentsky et al. | 250/222 PC X |
| 4,054,779 | 10/1977 | Wilke | 235/92 V X |
| 4,068,223 | 1/1978 | Steffen | 340/684 X |
| 4,149,163 | 4/1979 | Fathauer | 340/684 |

*Primary Examiner*—John W. Caldwell, Sr.
*Assistant Examiner*—Joseph E. Nowicki

*Attorney, Agent, or Firm*—Trexler, Bushnell & Wolters, Ltd.

[57] ABSTRACT

A seed monitoring apparatus for use with a seed planting machine includes a seed sensor comprising a housing forming a substantially tubular passageway and mounting a light source and three photosensitive elements arranged substantially in a triangular configuration. The arrangement of the light source and the triangular photosensor configuration is such that a seed passing through the tubular passageway will momentarily obscure the passage of light to the photosensor the apex of the triangle, if at all, before obscuring the passage of light to either of the photosensors forming the base of the triangle. The monitoring circuit includes two signal paths in which different methods of counting are used to produce different numbers of pulses in response to signals from the three photosensors. One or the other of these signal paths is selected automatically in accordance with the rate at which seeds are detected. One of these signal paths includes a delay circuit interposed in the line from the apical sensor while the other includes a one shot circuit interposed in the line from the same apical sensor. Additionally, a bunch detector circuit produces a predetermined number of additional pulses or counts in response to seeds detected substantially simultaneously at the two sensors forming the base of the triangle.

13 Claims, 21 Drawing Figures

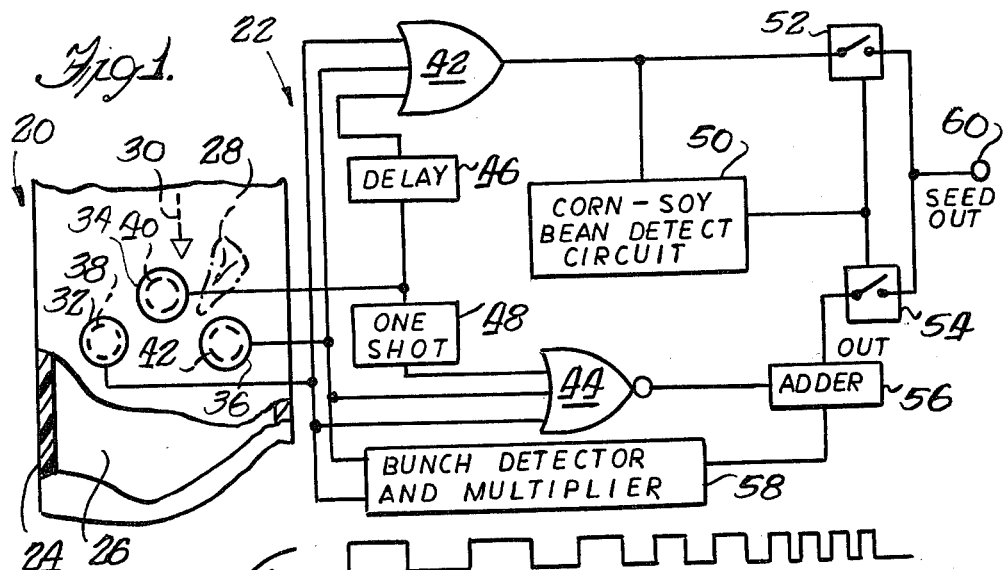
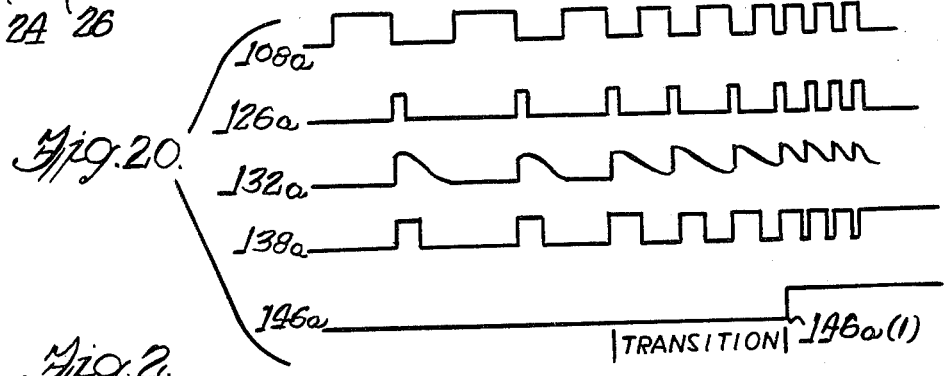
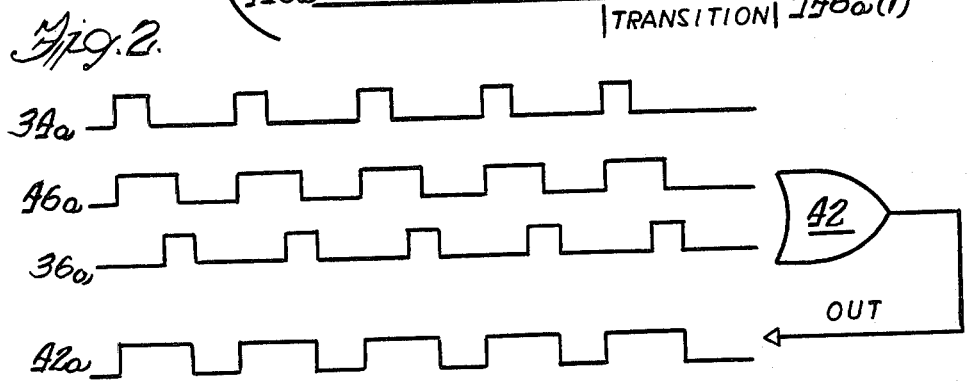
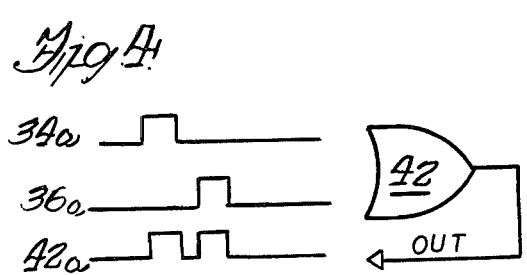
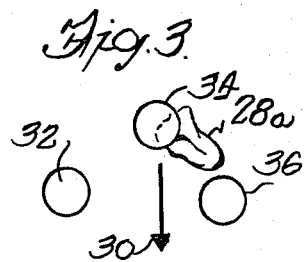

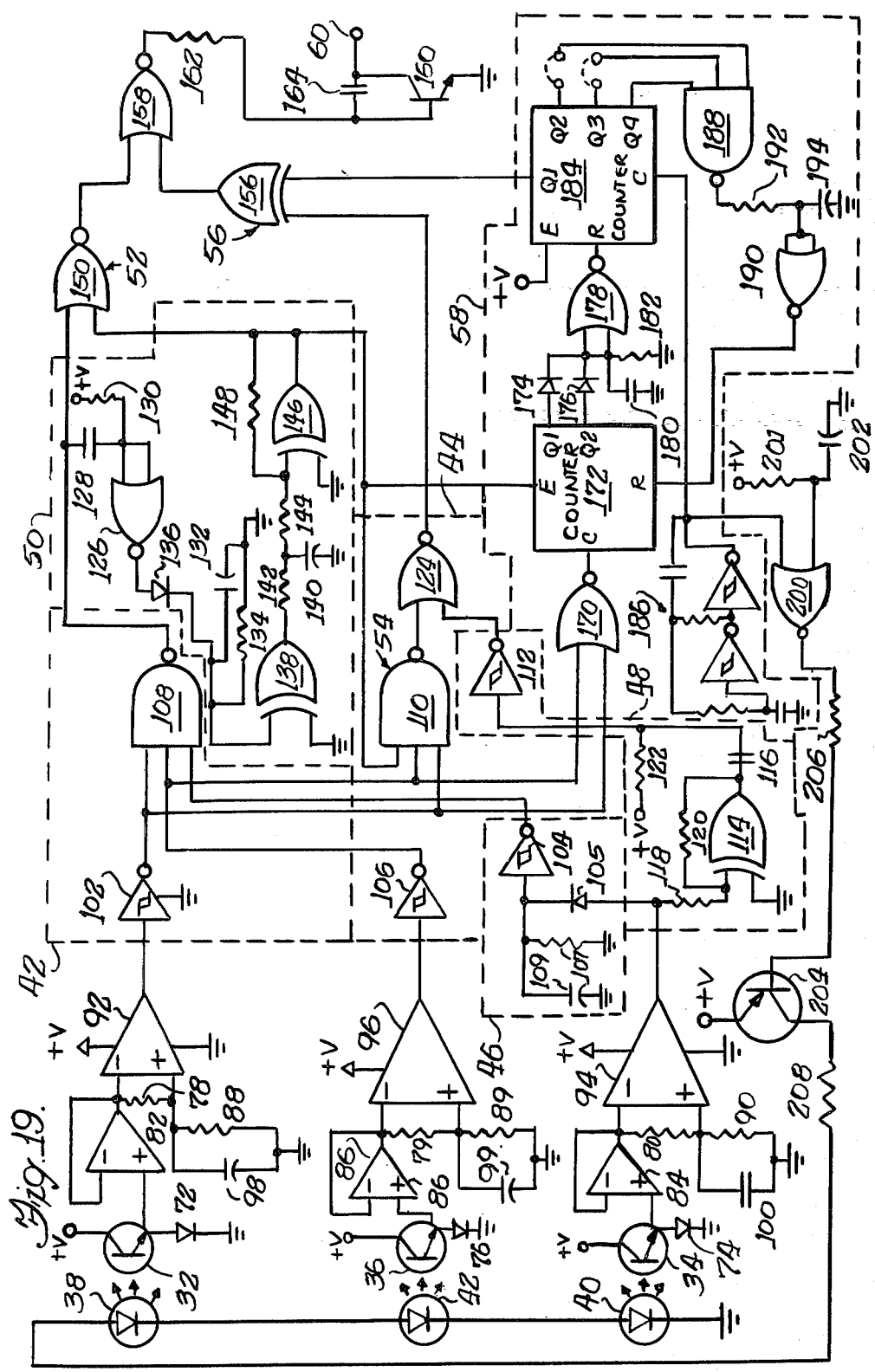

CORN AND SOYBEAN SENSOR

BACKGROUND OF THE INVENTION

This invention is directed generally to monitoring of a flow of discrete small articles, and more particularly to the accurate detection and counting of seeds being planted by a seed planting machine.

More specifically, the present invention is directed to the problem of providing a seed monitoring apparatus capable of providing a substantially accurate count of different types of seeds which may be planted by the same seed planting machine, but requires no action by the operator in the way of modifications or changing of components thereof to accomplish this end.

Seed monitoring and counting apparatus used in the past have generally included a housing or other means forming a path of travel for seeds to traverse on their way to the ground to be planted. Conventionally, a photosensor arrangement is used, consisting of one or more light emitting devices and one or more photo-sensitive elements mounted generally on opposing sides of the path of travel. Consequently, a seed passing along the path of travel will momentarily partially obscure the light falling on one or more of the photo-sensitive elements and thereby cause the emission of a signal therefrom. Suitable circuits are provided to receive these signals and to derive therefrom a pulse signal for driving a visual indicator device such as a flashing lamp or for driving a cumulative counter thereby keeping a running count of the number of seeds planted.

While such devices have been heretofore proposed and have in fact proven highly reliable in operation in monitoring and/or counting seeds of a particular type, it has heretofore been difficult or impossible to provide a single monitoring apparatus capable of monitoring different types or sizes of seeds. In this regard, at least three types of problems are encountered when it is desired to change over the planting machine from one type of seeds to another. Firstly, the difference in the sizes of different seeds (i.e., corn vs. soybeans) present a problem in that a given sensing arrangement having a given fixed sensitivity for the purpose of sensing a relatively large seed (e.g. corn) may fail to respond reliably to a substantially smaller seed (e.g., soybean). Secondly, the rate of planting may differ substantially for different types of seeds, such that a sensor having sufficient sensitivity for a given relatively slow rate of planting (e.g., of corn) may fail to respond rapidly enough to count all of the seeds planted at a substantially higher rate of planting (e.g., soybeans). Thirdly, the attitude of seeds at the point of detection by the sensor may differ substantially when different types of seeds are being planted. In addition to the foregoing problems, both the rates of planting and attitudes of seeds may also differ as between seed planting machines of different makes and models or configurations.

With particular reference to the problems encountered when switching over from planting corn to planting soybeans, it should be noted that soybeans are substantially smaller than kernels of corn and moreover that typical planting rates for soybeans tend to be significantly higher than those for corn. Accordingly, a soybean passing a seed sensing device will not only be considerably smaller than a corn kernel, but will also be followed more closely by additional soybeans. Consequently, the sensing and counting of soybeans place a considerably greater demand, in terms of both sensitivity of response and accuracy, upon the sensor and associated monitoring apparatus than do the sensing and counting of corn. Additionally, a problem has heretofor been encountered in obtaining adequate "coverage" of the entire path of travel without unduly narrowing the path of travel which may cause clogging, particularly at the high rate of planting of soybeans. However, it will be recognized that attempts to use two or more photo-sensitive devices to "cover" the path of travel may result in erroneous counts of the seeds because a single seed may trigger a response from both photo-sensitive elements.

OBJECTS AND SUMMARY OF THE INVENTION

Accordingly, it is a general object of this invention to provide a new and improved seed monitoring apparatus for monitoring the passage of seeds along a predetermined path of travel in a seed planting machine.

A more specific object is to provide a seed monitoring apparatus of the foregoing type specifically adapted to accurately monitor the passage of seeds when the planting machine is changed over from planting one type of seed to another substantially different type of seed, without requiring any modification of the monitoring apparatus.

Another object is to provide a seed monitoring apparatus in accordance with the foregoing objects which is capable of monitoring the passage of either corn or soybeans through the same path of travel in a seed planting machine, without requiring any modification to the seed monitoring apparatus when the machine is changed over from the planting of corn to the planting of soybeans or vice-versa.

It is a further object of the invention to provide a single monitoring apparatus suitable for use on a broad variety of makes and models of planting machines of different configuration, with but a minimum of change or modification in the apparatus.

Briefly, and in accordance with the foregoing objects, a seed monitoring apparatus in accordance with one aspect of the invention comprises conduit means defining the path of travel, a source of light mounted on said conduit means in optical alignment with said path of travel, light sensitive means mounted on said conduit means in optical alignment with said light source and with said path of travel emitting an electrical signal responsive to a momentary change in the light level on said light sensitive means due to passage of a seed along said path of travel and between said light source and said light sensitive means, and monitoring circuit means responsive to said electrical signal for producing one or more pulse signals and including means for varying the number of pulse signals produced in accordance with the rate at which said electrical signals are produced, said last-mentioned rate varying in a predetermined fashion in accordance with the rate at which seeds pass along said path of travel.

In accordance with another aspect of the invention a novel sensor for use in a seed monitoring apparatus of the type described comprises housing means providing a path of travel for seeds, light source means mounted on said housing means in optical alignment with said path of travel and a plurality of light sensitive means each mounted in optical alignment with said light source means and in alignment with a predetermined transverse plane in said path of travel, said plurality of light sensitive elements being arranged with respect to said path of travel such that a single seed must first traverse the transverse plane of the path of travel in alignment with a predetermined one of said light-sensitive means before traversing the transverse plane of the path of travel in alignment with any other one of said light sensitive means.

BRIEF DESCRIPTION OF THE DRAWINGS

The foregoing, as well as other objects, features and advantages of the invention will be more readily appreciated upon consideration of the following detailed description, together with the accompanying drawings, wherein:

FIG. 1 is a diagram of a monitoring apparatus in accordance with invention, including a seed sensor, partially cut away and partially in section, and associated monitoring circuitry and block diagrammmatic form;

FIG. 2 is a waveform diagram illustrating the operation of a portion of the monitoring circuit of the invention;

FIGS. 3 and 4 comprise, respectively, a schematic illustration of one aspect of the operation of the seed sensor of the invention and a waveform diagram of the responsive operation of the monitor of the invention;

FIG. 19 is a schematic circuit diagram of the monitoring apparatus of the apparatus; and, FIGS. 20 and 21 are waveform diagrams illustrating the operation of several portions of the monitor of the invention.

DETAILED DESCRIPTION OF THE ILLUSTRATED EMBODIMENT

Figure 5:
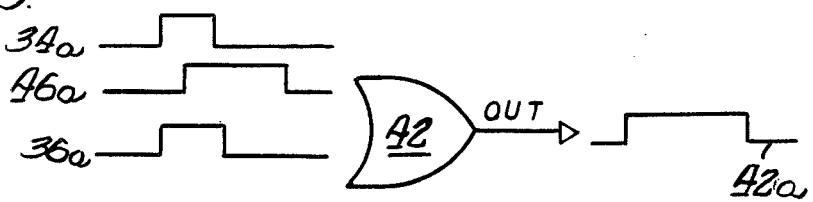
FIGS. 5 and 6 are further waveform diagrams illustrating further aspects of the operation of the novel monitor of the invention.

Referring initially to FIG. 1, a seed sensing apparatus or seed sensor constructed in accordance with principals of the invention is designated generally by the reference numeral 20. This seed sensing apparatus 20 is associated with novel monitoring apparatus of the invention, designated generally by the reference numeral 22. Referring initially to the seed sensing apparatus or seed sensor 20, a generally tubular conduit 24 forms or defines a path of travel 26 interiorly thereof for the delivery of seeds from the planting machine (not shown) to the ground to be planted. A typical seed 28 is indicated in phantom line, the direction of travel of seeds through conduit 24 being indicated by an arrow 30.

In accordance with a feature of the invention, three photo-sensitive devices 32, 34 and 36 are mounted through the wall of the conduit 24, each in optical alignment with a portion of the path of travel 26 therethrough. In a preferred embodiment, these photo-responsive elements 32, 34 and 36 comprise photo-transistors of the type generally designated CLR2050. Illuminating means is mounted through a wall of the conduit 24 opposite the photo-transistors 32, 34 and 36, so as to be in optical alignment with the conduit 26 and also with the photo-transistors 32, 34 and 36. In a preferred embodiment, these illuminating means comprise three light emitting diodes (LED's) 38, 40 and 42 of the type generally designated SG1009A each mounted in facing relation to one of the photo-transistors 32,34, 36. Consequently, passage of a seed such as the seed 28 between one of the LED's 38, 40 or 42 and its associated photo-transistors 32, 34 or 36 causes a momentary change in light level incident on the associated phototransistor and consequently the emission of a detectable electrical signal therefrom.

In accordance with a further feature of the invention, these three photo-transistors 32, 34 and 36 are mounted in a generally triangular configuration on the conduit 24, the photo-transistor 34 defining the apex of a triangle and the photo-transistors 32 and 36 defining the two ends of the base thereof. The apical photo-transistor 34 is positioned at the "upper" end of the conduit with respect to the direction of travel of the seed 28 as indicated by the arrow 30. Moreover, the spacing between photo-transistors 32 and 36 is such that a typical soybean such as seed 29 (see FIG. 7 e.g.) cannot pass in optical alignment with both. Stated another way, a corn seed such as the seed 28 may pass along the path of travel 26 so as to cause the emission of a signal from any one or more of the photo-transistors 32, 34 or 36. However, a typical soybean such as the seed 29 (e.g. see FIG. 7) cannot pass along the path of travel 26 in such a way as to cause a signal to be emitted from both photo-transistors 32 and 36, due to the described spacing therebetween.

In an alternate embodiment (not shown) the illuminating means comprises two such LED's spaced substantially half-way between the respective pairs of photo-transistors 32, 34 and 36. Stated another way, a pair of LED's may alternatively be provided spaced opposite the imaginary lines forming the two sides of the triangle defined by the photo-transistors 32, 34 and 34, 36. Suitable focusing lenses (not shown) may also be used to focus the light emitted from these LED's so as to illuminate all three of the photo-transistors 32, 34 and 36 substantially equally from only a pair of LED's located in this fashion.

Reference is next directed to FIG. 1 to the novel monitoring circuitry designated generally 22 (here shown in block form) which advantageously cooperates with the above-described sensor 20 in assuring the accurate monitoring of the flow of seeds along the path of travel 26. Advantageously, this novel monitoring circuit 22 cooperates with the sensor 20 to assure a substantially accurate count of either corn or soybeans, without requiring change or modification to either the sensor 20 or the circuit 22, when an associated planter is changed over from planting one type of seed to the other.

The sensor 32 feeds a first input of each of two three-input gates or gating circuits 42 and 44. Similarly, the photo-transistor 36 feeds a second input of each of the gates 42 and 44. The remaining photo-transistor 34 feeds a delay circuit 46 and a one shot circuit 48. The delay circuit 46 feeds the remaining input of the gating circuit 42 while the one shot 48 feeds the remaining input of the gating circuit 44. Each of these gating circuits 42 and 44 is advantageously adapted to produce a predetermined number of pulse signals at its output in response to the electrical signals received from the respective photo-transistors 32, 36 and from the photo-transistor 34 by way of the delay 46 and the one shot 48, respectively. A corn-soybean detect circuit 50 is provided at the output of the gating circuit 42 and functions to either enable or disable the outputs from the respective gating circuits 42, 44, depending on whether corn or soybeans are being planted, as detected thereby. Accordingly, the gating circuit 42 may be hereinafter called the corn circuit while the gating circuit 44 may be hereinafter called a soybean circuit.

As will be more fully described hereinbelow, the corn-soybean detect circuit works on the principle that the rate of planting of soybean seeds is generally considerably higher than that or corn seeds. Accordingly, a predetermined threshold rate is determined, below which the circuit 50 will enable the output of the corn circuit 42 as indicated schematically by a switch 52, and disable the soybean circuit 44 as indicated schematically by a switch 54. Above this predetermined rate, the circuit 50 will perform the opposite function, that is, enable the output of soybean circuit 44 and disable the output of corn circuit 42. As is more fully discussed below the corn circuit 42 functions substantially as an OR circuit, while the soybean circuit 44 functions substantially as a NOR circuit.

In accordance with a further feature of the invention, the output of the soybean circuit 44 is fed to an adder circuit 56. The number of pulses produced from this adder circuit 56 is equal to the sum of the number of pulses delivered thereto by the soybean circuit 44 and the number of pulses delivered thereto by a bunch detector and multiplier circuit 58. This bunch detector and multiplier circuit 58 is fed by the photo-transistors 32 and 36, and is adapted to deliver a predetermined number of additional pulses to the adder 56 when electrical signals are received substantially simultaneously from the two sensors 32 and 36. Since a single seed such as seed 28 is incapable of causing the simultaneous emission of electrical signals from photo-transistors 32 and 36, it will be recognized that the occurrence of such signals is indicative of two or more seeds being simultaneously present in the path of travel 26 of the sensor 20. Consequently, the number of pulses ultimately produced at a "seed out" terminal 60 substantially accurately reflects the number of seeds which have passed along the path of travel 26, and hence the number of seeds planted by the associated planting chute or drill of the associated seed planting machine.

Referring to the ensuing FIGS. 2 through 18, various aspects of operation of the novel monitoring apparatus of FIG. 1 will be discussed, with reference also to the diagram of FIG. 1.

Referring now to FIGS. 2 and 3, the corn (OR) circuit 42 cooperates with the delay circuit 46 to advantageously produce only a single pulse or count for each kernel of corn passing along the path of travel 26, even if this single kernel causes the emission of signals from two of the photo-transistors, i.e., both 32 and 34 or both 34 and 36. It will be remembered, that it is also possible for a single corn seed to cause the emission of signals from both photo-transistors 32 and 36. As illustrated in FIG. 3, a single seed 28a moves in the direction 30 so as to cause emission of signals from the photo-transistors 34 and 36, in that order.

In FIGS. 2 through 18 the subscript "a" is used with the reference numerals identifying the various elements shown in FIG. 1, to designate the signals at the outputs of these elements. A signal 34a (FIG. 3) from the photo-transistor 34 comprises a train of pulses of relatively narrow width, generally corresponding to the time required for the signal level from photo-transistor 34 to return to "normal" after the passage of a seed such as the seed 28a. The delayed signal from the delay circuit 46, however, has a longer, predetermined pulse width, such that the somewhat later signal 36a from sensor 36 is effectively "merged" therewith by the OR gating effect of the corn circuit 42, to result in output pulses 42a being produced, only one pulse for each seed.

Referring briefly to FIG. 4, if the delay circuit 46 were eliminated, the output of the OR circuit 42 might well be two pulses 42a for the passage of only one corn seed 28a in the fashion illustrated in FIG. 3. Hence, the delay circuit illustrating 46 avoids a possible over-count of those corn seeds which trigger two of the photo-transistors.

Referring to FIG. 5, if a seed such as seed 28a arrives at or triggers two photo-transistors, 34 and 36 for example, substantially simultaneously, the relatively longer delay on the resultant signal due to delay circuit 46, although not strictly needed to insure the production of but a single pulse, nonetheless has no adverse effect, since the output of the OR circuit 42 remains but a single pulse 42a.

Figure 6:
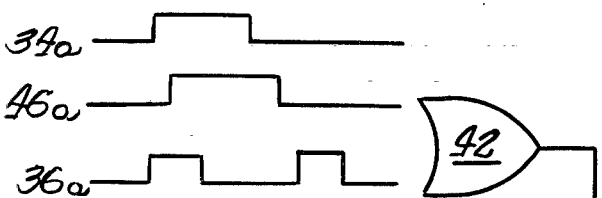

As illustrated in FIG. 6, assuming that two kernels of corn fall past the sensor 36, triggering it twice so as to emit two pulses 36a, the OR circuit 42 will in most instances correctly reproduce two pulses 42a. Advantageously, the delay provided by circuit 46 is shorter than the time typically required for a second kernel of corn to traverse the passageway 26, given the typical rates at which such corn seeds are usually planted.

Reference is next invited to FIGS. 7-16 where the cooperative operation of the soybean circuit 44 and one shot circuit 48 is described with reference to various combinations of relatively large and relatively small soybeans falling in various attitudes and numbers past the sensors or photo-transistors 32, 34 and 36.

Figure 7:
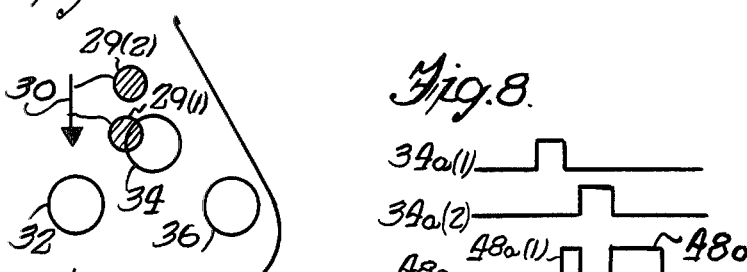
FIGS. 7 and 8 are similar to FIG. 3 and FIG. 4 and comprise, respectively, a schematic illustration of another aspect of the operation of the sensor of the invention and a waveform diagram of the responsive operation of the monitor of the invention.
Figure 8:
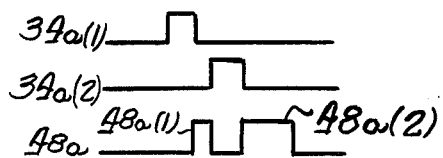

Referring initially to FIG. 7 and FIG. 8 the operation of the one shot circuit 48 is illustrated. In FIG. 7, two soybeans seeds 29(1) and 29(2) are illustrated traveling in the direction 30 and triggering an output from the photo-transistor 34. In FIG. 8, the pulses 34a(1) and 34a(2) are typical of the signals produced by photo-transistor 34a in response to the passage of these two soybean seeds. The two pulses on line 48a are those produced by the one shot 48, which is a negative edge-triggered one shot. The first pulse 48a(1), it will be noted, is "cut short" by the arrival of the positive-going edge of the pulse 34a(2), whose negative edge triggers a second pulse 48a(2) of a typical pulse width (i.e. not "cut short") from the one-shot circuit 48. It will be noted that use of this one shot 48 rather than the delay circuit 46 prevents the "obscuring" effect caused by the delay circuit 46 in the counting of corn seeds. This is advantageous in counting soybeans which typically are planted at a considerably higher rate, and therefore will typically fall past a single sensor such as the photo-transistor 34 at more frequent intervals than is typical of the corn seeds discussed above. Hence, the "cutting short" of the pulse from the one shot in order to produce a further pulse is advantageous in assuring a separate pulse output for each soybean passing a single sensor such as the photo-transistor 34.

Figure 9:
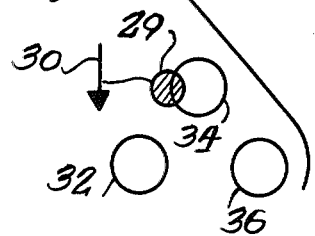
FIG. 9 and FIG. 10 comprise a schematic illustration of the seed sensor and a further waveform diagram, similar to FIG. 7 and FIG. 8, which illustrate a further aspect of the operation of the invention.
Figure 10:
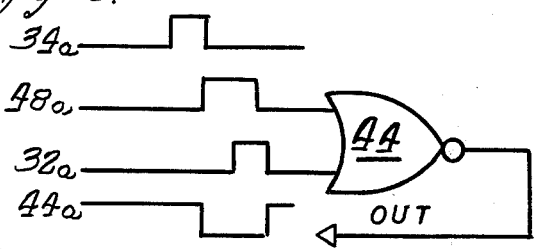

In FIG. 9 and FIG. 10, a single, relatively small soybean 29 and the resultant signals at various points in the circuit 22, up to and including the output of the NOR circuit 44, are illustrated. This soybean 29, as illustrated in FIG. 9, travels in the direction 30 so as to cause the emission of responsive signals from the photo-transistor 34 and from the photo-transistor 32, shortly thereafter. As viewed in FIG. 10, the waveform at the output of photo-transistor 34a is fed through one shot 48, resulting in a one shot output pulse 48a of "typical" width, similar to that shown at 48a(2) of FIG. 8 and discussed above. Hence, the following pulse 32a, due to passage of the bean 29 past photo-transistor 32, is effectively "masked" by the one shot pulse 48a at the NOR circuit 44. The resultant output 44a of NOR circuit 44 is thus a single pulse, accurately counting the soybean 29 only once, even though it has effectively triggered two of the photo-transistors. Since the gating circuit 44 provides a NOR function, the waveform 44a is inverted with respect to the other waveforms illustrated in FIG. 10.

Figure 11:
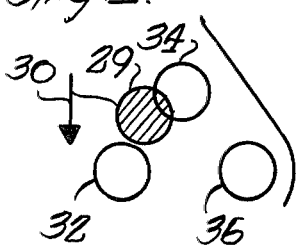
FIG. 11 and FIG. 12 are further diagrams similar to FIG. 9 and FIG. 10, respectively, and illustrate a still further aspect of the operation of the invention.
Figure 12:
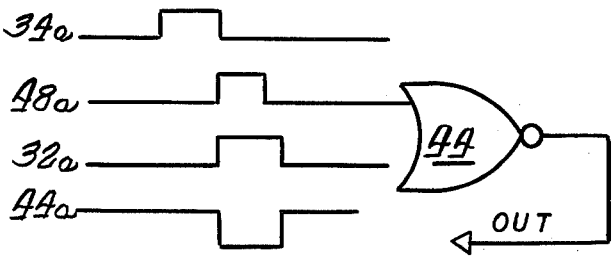

For a relatively larger bean, as illustrated in FIGS. 11 and 12, the effect is similar, the pulse widths seen at 34a and 32a being relatively longer due to the larger physical size of the bean 29 in FIG. 11. The negative edge-triggered one shot 48 produces a pulse 48a (FIG. 12) which occurs substantially overlapping the pulse signal 32a from photo-transistor 32, resulting again in but a single output pulse 44a from the gating circuit 44, accurately reflecting the passage of the single bean 29.

Figure 13:
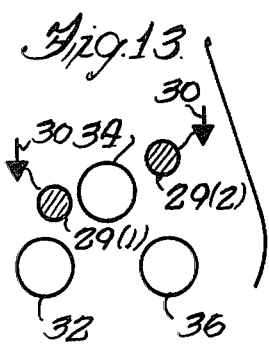
FIG. 13 and FIG. 14 are further diagrams, similar to FIG. 11 and FIG. 12 and illustrating yet another aspect of the operation of the invention.
Figure 14:
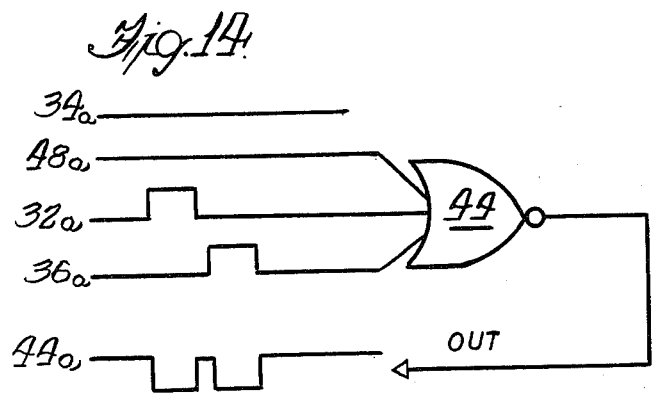
Figure 15:
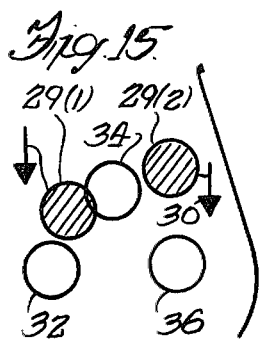
FIG. 15 and FIG. 16 are further diagrams similar to FIG. 13 and FIG. 14 and illustrating a still further aspect of the operation of the invention.
Figure 16:
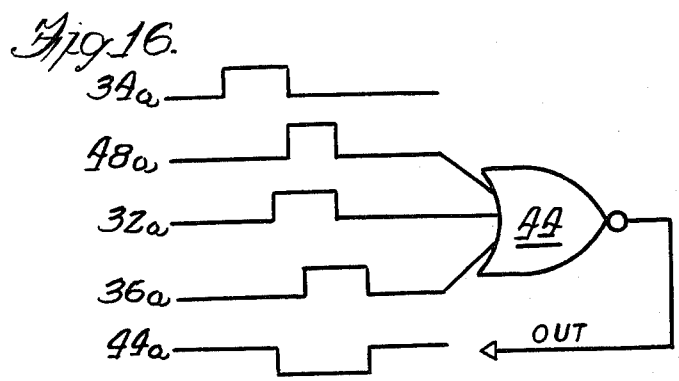

The diagrammatic representations of FIG. 13 and FIG. 15, together with the waveform diagrams of FIGS. 14 and 16, respectively, illustrate operation of the soybean circuit 44 and one shot 48 in the cases where two relatively small beans and two relatively large beans, respectively, actuate the photo-transistors. Referring first to FIG. 13, a pair of relatively small beans 29(1) and 29(2) travel in the direction 30 so as to emit signals from the photo-transistors 32 and 36, but not from the photo-transistor 34. As viewed in FIG. 14, the signals 34a from photo-transistor 34 and hence the output 48a from one shot 48 are thus "flat". The signal from photo-transistor 32a is a pulse of typical width for the relatively small bean 29(1) while the signal from the photo-transistor 36a is similar, although somewhat later in time, due to the position of bean 29(2) somewhat behind bean 29(1). The resultant output 44a of NOR circuit 44 is a pair of pulses correctly reflecting passage of the two beans 29(1) and 29(2).

In FIG. 15, two relatively large beans 29(1) and 29(2) similarly travel in the direction 30. However, the bean 29(1) is sufficiently large to cause emission of a signal from photo-transistor 34 and somewhat later, the emission of a second responsive signal from photo-transistor 32. The bean 29(2), however, "misses" photo-transistor 34, causing emission of a responsive signal only from photo-transistor 36. The wave forms of FIG. 16 reflect the foregoing trajectory of the two beans, a pulse 34a of typical width for the relatively large bean 29(1) being transformed by the negative edge following one shot 48 to a typical one shot pulse 48a. The somewhat later pulse 32a due to passage of bean 29(1) in registry with photo-transistor 32 and a similar pulse 36a due to passage of bean 29(2) in registry with photo-transistor 36, form the other two inputs to NOR circuit 44. The output 44a is seen, however, to constitute but a single pulse. This is primarily due to the relatively larger size and close proximity of the two beans 29(1) and 29(2), such that the responsive pulses tend to overlap, thus resulting in only a single pulse output from the NOR circuit 44. However, the bunch detector and multiplier circuit 58, which will be described shortly, advantageously comes into play in such a situation, to "correct" the output of the monitor.

Figure 17:
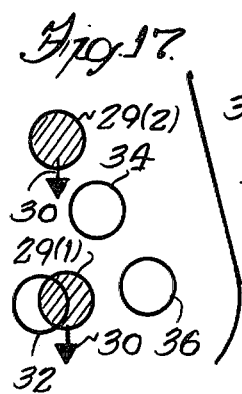
FIG. 17 and FIG. 18 are further waveform diagrams, similar to FIG. 5 and FIG. 6, and illustrating further aspects of the operation of the invention.
Figure 18:
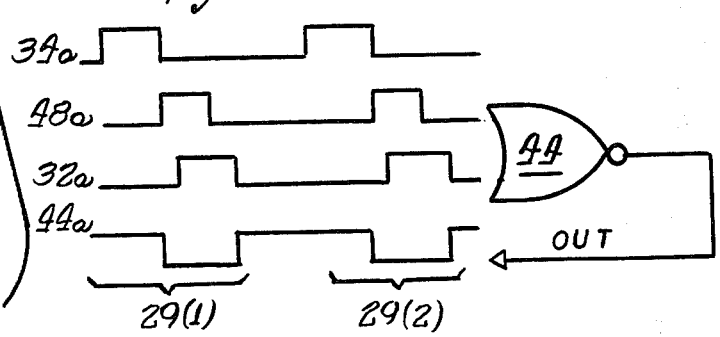

Referring briefly to FIG. 17 and FIG. 18, and by way of summary, an "average" or "normal" situation in the soybean circuit is illustrated. In FIG. 17, a pair of "typical" size beans 29(1) and 29(2) are shown traversing the path of travel in the direction 30 at a generally "typical" spacing, each causing emission of signals from both photo-transistors 34 and 32, in that order. In FIG. 18, the two pulse signals 34a produced by photo-transistor 34 are transformed by the one shot 48 into typical pulses 48a. Similarly, the two pulse signals emitted by photo-transistor 32 are shown on line 32a. While the signals due to the same bean effectively overlap, and therefore cause only a single signal to be emitted on line 44a from the gating circuit 44, the two sets of signal pulses from the two beans 29(1) and 29(2) are sufficiently spaced apart in time so as to result in the expected two pulse signals 44a from NOR circuit 44.

Referring now to FIG. 19, the structure of monitoring circuit 22 is illustrated in detail, together with the photo-transistors 32, 34 and 36 and their associated LED's 38, 40 and 42. As mentioned above, the LED's 38, 40 and 42 are in optical alignment respectively with the photo-responsive transistors 32, 34 and 36. Thus, the passage of a seed between an LED and its associated photo-transistor generally causes a momentary decrease in the amount of light incident upon the photo-transistor. Each of the photo-transistors 32, 34 and 36 is provided with a suitable positive biasing voltage at its collector electrode, and each has its emitter electrode joined with the anode of a respective one of diodes 72, 74, 76, whose cathodes are joined with ground. The base electrode of each photo-transistor 32, 34, 36 is the photo-responsive portion thereof. The emitter electrode of each photo-transistor 32, 34 and 36 is further joined with the non-inverting input of an operational amplifier 82, 84, 86, each of which has its inverting input connected by a feedback line to its output which in turn feeds the inverting input of a further operational amplifier 92, 94, 96. A suitable resistor 78, 79, 80 bridges the respective inverting and noninverting inputs of the three operational amplifiers 92, 94, and 96, and together with a further resistor 88, 89, 90, each running to ground, forms a voltage divider for each of the three op amps 92, 94, 96. A suitable RC time delay between the respective inverting and non-inverting inputs of these op amps 92, 94, 96 is provided by a capacitor 98, 99, 100, connected across each of these resistors 88, 89 and 90.

In operation, with reference to the photo-transistor 32 and associated input circuitry just described, when a seed blocks the light incident on photo-transistor 32 from LED 38, a momentary loss of bias current to the base electrode is experienced. This momentary reduction in bias current causes a corresponding momentary reduction in collector current, such that less current flows through diode 72 causing a momentary reduction in the forward voltage cross diode 72, which is suitably amplified by operational amplifier 82. The negative or inverting input of operational amplifier 92 "sees" this amplified voltage change, whereas the non-inverting or positive input does not "see" the variation, due to the effect of capacitor 98. If the momentary voltage change is greater than the voltage drop across the resistor 78, the operational amplifier 92 responds by outputting a corresponding voltage pulse.

The outputs of operational amplifiers 92 and 96 are fed to respective Schmitt trigger circuits 102 and 106, whose outputs in turn feed two inputs of a three-input NAND gate 108. These two trigger circuits 102 and 106 also feed two inputs of a second three-input NAND gate 110. The remaining operational amplifier 94, associated with the "apical" photo-transistor 34 (i.e., photo-transistor 34 forms the apex of the triangle defined by the three photo-transistors, as best viewed in FIG. 1) feeds the delay circuit 46 and the one shot circuit 48. The delay circuit 46 comprises a Schmitt trigger 104 which is fed from the output of OP AMP 94 by way of a diode 105. A suitable time constant is provided by a grounded parallel combination of resistors 107 with capacitor 109 at the input to the Schmitt trigger 104.

The one shot circuit 48 is formed by a further Schmitt trigger 112, which is fed from the output of an exclusive OR gate 114 by way of a capacitor 116. The exclusive OR gate 114 is of the two-input variety, having one input grounded and the other input fed from the output of OP AMP 94 by way of a series resistor 118. A feedback resistor 120 is also provided at this input of the exclusive OR gate 114. A pull-up resistor 122 is also provided at the input of Schmitt trigger 112.

The output of the Schmitt trigger 104 feeds the remaining input of NAND gate 108, while the output of Schmitt trigger 112 feeds one input of a two-input NOR gate 124, whose other input is fed from the output of the NAND gate 110. It will be recognized that the combination of the Schmitt trigger circuits 102, 104 and 106, with NAND gate 108 form a logic equivalent circuit to a three-input OR gate, hence, the designation of the circuit 42 in FIG. 1 as a three-input OR gate. Similarly, the combination of the Schmitt triggers 102 and 106 with NAND gate 110, and the further series combination of NAND gate 110 and Schmitt trigger 112 with NOR gate 124 form a logic equivalent circuit of a three-input NOR gate, hence, the diagrammatic representation of the circuit 44 in FIG. 1 as a three-input NOR gate.

The corn-soybean detect circuit 50 receives a single input from the output of the NAND gate 108, which feeds both inputs of a NOR gate 126 by way of a suitable capacitor 128. This NOR gate 126 is also provided with a suitable pull-up resistor 130 and functions, therefore, as a one shot, producing a fixed width pulse upon reception of each pulse from NAND gate 108. It will be recognized that a seed viewed at any of the three photo-transistors 32, 34 or 36 will cause a corresponding pulse through NAND gate 108 and thereby trigger a pulse from NOR gate 126. These trigger pulses feed an RC circuit comprising a capacitor 132 in parallel with a resistor 134, running to ground, by way of a suitable diode 136. The capacitor 132, the resistor 134 and the diode 136 cooperate to cause a constant width one-shot trigger pulse to be produced by a following two-input exclusive-OR gate 138, in response to each triggering pulse from the gate 126. This exclusive-OR gate 138 feeds an integrator comprising a capacitor 140 and a resistor 142. A second resistor 144 feeds the integrated signal to one input of a further two-input-exclusive-OR gate 146 which functions as a threshold detector. A feedback resistor 148 is provided from the output of this exclusive-OR gate 146 to its input fed by resistor 144. This output also feeds one input of a two-input NOR gate 150 and the remaining input of the three-input NAND gate 110.

The NOR gate 150 and the NAND gate 110, as will be seen shortly, thereby perform the functions of the switching components 52 and 54 schematically illustrated in FIG. 1, and are therefore also generally indicated by like reference numerals here in FIG. 19.

Referring now briefly to FIG. 20, the waveforms illustrate generally the operation of the corn-soybean detect circuit 50 just discussed. In similar fashion to the previous waveform diagrams, the signals at the outputs of components of the circuit of FIG. 19 will be indicated by the reference numeral identifying the circuit components together with the letter "a". Accordingly, the pulses 108a represent a gradually increasing pulse rate at the output of the gate 108, corresponding to a gradually increasing rate of seed flow as detected at the sensors 32, 34 and/or 36. The output of the trigger circuit (at the output of NOR gate 126) in response to this pulse signal 108a is represented by the signal or waveform 126a, which comprises a negative edge-triggered, constant width trigger pulse for each of the pulses 108a.

In response to these trigger pulses 126a, the charging and discharging waveform of capacitor 132 is represented by the signal waveform 132a. It will be noted that as the pulses 126a become more frequent, the capacitor 132 is unable to fully discharge before the onset of the following one shot pulse. The output of the exclusive OR gate 138 is next represented by the signal or waveform 138a, while the waveform at the output of the following exclusive-OR gate 146 is labeled 146a. It will be noted that as the frequency of pulses 138a increases so that the duty cycle of the pulses is greater than 50%, the waveform 146a goes from a low state to a high state, as seen at point 146a(1). The circuit portion comprising the exclusive-OR gate 146 and resistors 142, 144 and 148 provide sufficient hysteresis to avoid oscillation of the output of exclusive-OR gate 146 during the relative long transistion period (TRANSITION) as indicated in the waveform 146a of FIG. 20.

From the foregoing, it will be appreciated that when the output of gate 146 is low (logic 0), the rate of flow of seeds along the path of travel 26 is equal or less than some predetermined rate, whereas when the output of gate 146 is high, the rate of flow of seeds along the path of travel 26 is greater than this predetermined rate. In the illustrated embodiment, this predetermined "threshold" rate is chosen at substantially thirty seeds per second. This is particularly advantageous in distinguishing between corn and soybeans, as the latter are generally planted with a population density that achieves a rate of substantially greater than thirty seeds per second through a typical path such as the path of travel 26, whereas corn is generally planted at a considerably lesser rate. Moreover, it will be recognized that a logic 0 at the output of gate 146 enables the signal from the corn circuit 42 at the NOR gate 150, while disabling the signal at the NAND gate 110 of the soybean circuit 44. However, when the output of gate 46 is high or logic 1, the opposite occurs, the signals at gate 150 being effectively disabled and gate 110 being effectively enabled.

The signals at gate 110 feed the NOR gate 124 which in turn feeds one input of the adder circuit 56. In the illustrated embodiment, referring again to FIG. 19, the adder 56 comprises a two-input exclusive-OR gate 156. NOR gate 124 feeds one input of the exclusive-OR gate 156. The NOR gate 150 and the exclusive-OR gate 156 each feed one input of a two-input NOR gate 158, whose output feeds the "seed count" output 60 of the monitoring circuit, by way of a suitable gating transistor 160. The NOR gate 158 feeds the base electrode of the transistor 160 through a suitable resistor 162 and a suitable capacitor 164 is coupled between the collector electrode and the base electrode of the transistor 160 whose emitter electrode is grounded.

The operation of the bunch detector and multiplier circuit 58 will now be discussed with reference to the remaining portion of FIG. 19, together with a description of the function of the adder-exclusive-OR gate 156 as illustrated by the waveform diagram in FIG. 21, to which reference is also invited. The bunch detector circuit 58 receives as controlling or actuating inputs the seed pulse signals from the Schmitt trigger circuits 102 and 106, which it will be remembered produce seed pulse signals in response to detection of a seed at the respective photo-transistors 32 and 36. These two input signals feed the respective inputs of a two-input NOR gate 170 whose output feeds a clock input C of a four-bit binary counter 172. The Q1 and Q2 bits of counter 172 are OR'd together by a pair of suitable diodes 174, 176 which feed both inputs of a two-input NOR gate 178. The inputs of this NOR gate 178 also is provided with a capacitor 180 and a resistor 182 running in parallel to ground. The NOR gate 178 feeds the reset input R of a second, similar four-bit counter 184, whose Q1 output bit feeds the remaining input of exclusive-OR gate 156.

In the illustrated embodiment, the counters 172 and 184 are both of the type generally designated CD4520. The count input C of the counter 184 is fed from a clock oscillator designated generally 186 and comprising a pair of Schmitt triggers coupled with suitable resistors and capacitors to form a conventional oscillator circuit. The remaining bit outputs Q2, Q3 and Q4 of counter 184 are selectively connectable with the respective inputs of a three-input NAND gate 188 whose output feeds both inputs of a two-input NOR gate 190 by way of a series connected resistor 192. A capacitor 194 is coupled between the inputs of NOR gate 190 and ground. The output of this NOR gate 190 provides the reset input R of the counter 172.

The enable input of the counter 184 is tied to a suitable positive voltage supply, while the enable input of the counter 172 is tied to the output of exclusive-OR gate 146, thereby enabling the bunch detector and multiplier circuit 58 only when the soybean circuit 44 is enabled. From the foregoing, it will be appreciated that the counter circuit 172 will be clocked from the gate 170 whenever overlapping seed pulses are produced by Schmitt triggers 102 and 106. This will of course occur whenever overlapping seed pulses are produced by seeds at the photo-transistors 32 and 36 in relatively close temporal proximity, for example as illustrated and discussed above with reference to FIG. 15 and FIG. 16. Stated another way, when seeds are present substantially simultaneously at the photo-transistors 32 and 36, the circuit 58 will be triggered into operation. In this regard, it will be noted that the Schmitt triggers 102 and 106, together with the NOR gate 170 form the logic equivalent of an AND gate.

When the clock pulse on counter 172 sets output Q1, the reset of counter 184 is driven low so that counter 184 becomes active. Counts from oscillator 186 may now drive the binary outputs of counter 184, so that the least significant output bit Q1 will produce a pulse output to the exclusive-OR gate 156 for each pulse received at the counter input C from the clock oscillator circuit 186. The remaining bit outputs Q2, Q3 and Q4 are selectively connectable to the respective inputs of NAND gate 188, such that from four to seven pulses may be produced in this fashion, before de-activation of counter 184 in response to resetting of counter 172 by way of gates 188 and 190. It will become apparent that at the selection of which output or outputs of Q2, Q3 and Q4 are jumpered to feed the respective inputs of NAND gate 188 will form a binary code determining the number of counts produced at the Q1 output before the setting of the counters 172 and 184 in this fashion.

The exclusive-OR gate 156 thereby acts as an adder, to add the seed pulses received from gate 124 with those produced by circuit 58.

Figure 21:
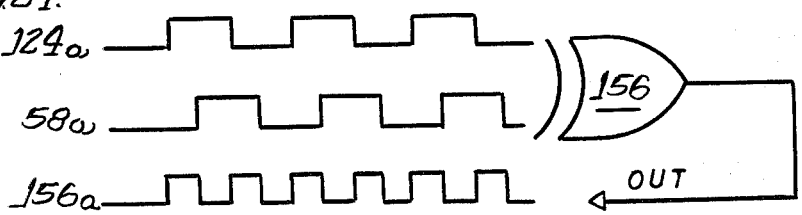

Referring briefly to FIG. 21, a typical string of output pulses at gate 124 is indicated by reference numeral 124a, while a typical output of bunch detector circuit 58 is indicated by reference numeral 58a. In accordance with the logic function of the exclusive-OR gate 156, the number of output pulses 156a produced thereby is, in effect, the sum of the pulses received at the respective inputs from these two circuits 58, 124.

A suitable setting of the number of pulses to be produced by the bunch detector and multiplier circuit 58 in response to a seed "bunch" or "double" at its input may be determined from the operational characteristics of the seed planting machine with which the monitor of the invention is associated. Conventional empirical studies may readily determine the relative frequency of such bunched or doubled seeds being delivered by various machines, and permit a choice of the number of extra pulses to be added for proper counting of seeds for such doubles or bunches, on the assumption that occasionally greater numbers of seeds will be released at sufficiently close intervals to be "missed" by the other circuits associated with the photo-transistors 32, 34 and 36. The connections of outputs Q1, Q2 and Q3 of counter 184 with inputs of NAND gate 188 may then be chosen accordingly for each type of model of planting machine. The phenomena of soybean seeds being released in such "bunches" is well known in the seed planting arts and need not be described in detail here.

In accordance with a further feature of a preferred embodiment, a self-testing arrangement is also provided, and is illustrated in FIG. 19. The oscillator or clock circuit 186 also fees one input of a two-input NOR gate 200, whose opposite input is provided with a suitable pull-up resistor 201 and a capacitor 202 running to ground. This NOR gate 200 feeds the base electrode of a PNP transistor 204 by way of a series-connected resistor 206. The emitter electrode of the transistor 204 is coupled to a suitable positive voltage source while the collector thereof feeds a resistor 208, whose opposite side is connected in series with the three LED's, 38, 40 and 42, such that the oscillations from the clock oscillator 186 will cause a pulsing on and off of LED's 38, 40 and 42, thereby simulating the momentary blockages of light therefrom experienced at the respective paired photo-transistors 32, 34 and 36 when seeds are present.

Since the rate of oscillations of the circuit 186 is known, observation of the output 60 for the correct number of pulses will verify proper operation of the sensor elements and associated circuit 22. When the circuit is initially powered up, the gate 200 is enabled until the capacitor 202 charges, and then becomes inoperative to enable this "self-test" mode for a brief period.

While the invention has been described with reference to a preferred embodiment, the invention is not limited thereto. On the contrary, those skilled in the art may well devise various changes, modifications and alternatives without departing from the spirit and scope of the invention as defined in the appended claims.

The invention is claimed as follows:

1. A seed monitoring apparatus for monitoring the passage of seeds along a predetermined path of travel in a seed planting machine including conduit means defining the path of travel, said apparatus comprising: light emitting means mounted on said conduit means in optical alignment with said path of travel, a plurality of light sensitive means mounted on said conduit means, each in optical alignment with said light emitting means and with a predetermined portion of said path of travel for producing an electrical signal responsive to a momentary change in the light level incident on said light sensitive means due to passage of a seed through said predetermined portion of the path of travel and between said light source and said light sensitive means, said plurality of light sensitive means being arranged such that each seed passing through said path of travel will cause the production of an electrical signal from at least one thereof, and monitoring circuit means responsive to said electrical signals for producing one or more pulse signals and including means for controlling the number of pulse signals produced in a predetermined fashion in accordance with which one or ones of said plurality of light sensitive means produces an electrical signal and in accordance with the rate at which said one or ones of said light sensitive means produce said electrical signals and wherein said controlling means includes first and second pulse signal producing circuits and rate circuit means responsive to the rate at which said electrical signals are produced for selecting the first pulse signal producing circuit when the rate is at or below a predetermined rate, and for selecting the second pulse signal producing circuit when the rate is above said predetermined rate.

2. A seed monitoring apparatus according to claim 1 wherein said plurality of light sensitive means comprises three phototransistors, each mounted in optical alignment with a predetermined portion of said path of travel, the three phototransistors being arranged to be in optical alignment collectively, with substantially an entire cross-sectional portion of the path of travel, and wherein each of said phototransistors produces said electrical signal in response to momentary change in the light level incident thereon due to the passage of a seed through said predetermined portion of said path of travel in alignment therewith.

3. A seed monitoring apparatus according to claim 1 wherein said means for controlling the number of pulse signals produced further includes means responsive to said plurality of light sensitive means for increasing the number of pulse signals produced in a predetermined fashion in accordance with which one or ones of said plurality of light sensitive devices produce an electrical signal.

4. A seed monitoring apparatus according to claim 2 wherein said first pulse signal producing circuit includes delay circuit means coupled with a selected one of said light sensitive means for causing a delayed pulse signal of a predetermined pulse width in response to a first received one of said electrical signals from said selected light sensitive means, said delay circuit means not producing further pulse signals until the end of said delayed pulse signal of predetermined pulse width and the subsequent receipt of another of said electrical signals, and wherein said second pulse signal producing circuit includes one shot circuit means also coupled to said selected one of said light sensitive means for producing a pulse of variable width in response to each and every one of said electrical signals received from said selected light sensitive means.

5. A seed monitoring apparatus according to claim 1 wherein said first pulse signal producing circuit includes delay circuit means and said second pulse signal producing circuit includes one shot circuit means.

6. A seed monitoring apparatus according to claim 2 wherein said controlling means includes means responsive to ones of said electrical signals occurring within a predetermined time interval from two predetermined ones of said plurality of light sensitive means for producing a predetermined number of additional pulse signals, and means for adding the additional pulse signals to selected other ones of the pulse signals produced by said monitoring circuit means.

7. A seed monitoring apparatus according to claim 1 wherein said plurality of light sensitive means comprise first, second and third photosensitive devices mounted in a substantially triangular configuration, the first photosensitive device defining the apex of a triangle, and the second and third photosensitive devices defining the base of said triangle, and wherein the apex of said triangle is arranged in optical alignment with said path of travel ahead of the base of said triangle with respect to the direction of travel of seeds therethrough.

8. A seed monitoring apparatus in accordance with claim 7 wherein said circuit means includes first and second pulse signal producing circuits and rate circuit means responsive to the rate at which said electrical signals are emitted for selecting the first pulse signals producing circuit when the rate is at or below a predetermined rate, and for selecting the second pulse signal producing circuit when the rate is above said predetermined rate, and wherein said first pulse signal producing circuit includes delay circuit means coupled with said first photosensitive device for causing a delayed pulse signal of a predetermined pulse width in response to a first received one of said electrical signals from said first photosensitive device and delay circuit means not producing further pulse signals until the end of said delayed pulse signal of predetermined pulse width and the subsequent receipt of another of said electrical signals from said first photosensitive device, and wherein said second pulse signal producing circuit includes one shot circuit means also coupled to said first photosensitive device for producing a pulse of variable width in response to each and every one of said electrical signals received from said first photosensitive device.

9. A monitoring circuit according to claim 7 or claim 8 wherein said circuit means includes means responsive to ones of said electrical signals occurring within a predetermined time interval from the second and third photosensitive devices for producing a predetermined number of additional pulse signals, and means for adding the additional pulse signals to other ones of the pulse signals produced by the circuit means.

10. A monitoring circuit for use in a seed monitoring apparatus including a seed sensor comprising a housing providing a path of travel for seeds and a plurality of sensor means each mounted on said housing means for detecting passage of a seed through a predetermined associated portion of said path of travel and for emitting an electrical signal in response thereto, said monitoring circuit comprising: means responsive to said electrical signals for producing one or more pulse signals and including means for controlling the number of pulse signals produced in accordance with which one or ones of said sensor means emits an electrical signal in response to each seed and in accordance with the rate at which said one or ones of said sensor means emit said electrical signals and wherein said controlling means includes first and second pulse signal producing circuits and rate circuit means responsive to the rate at which said electrical signals are emitted for selecting the first pulse signal producing circuit when the rate is at or below a predetermined rate and for selecting the second pulse signal producing circuit when the rate is above said predetermined rate.

11. A monitoring circuit according to claim 10 wherein said means for controlling the number of pulse signals produced further includes means responsive to said plurality of sensor means for increasing the number of pulse signals produced in a predetermined fashion in accordance with which one or ones of said plurality of sensor means emits an electrical signal.

12. A monitoring circuit according to claim 10 wherein said first pulse signal producing circuit includes delay circuit means coupled with a selected one of said sensor means for causing a delay signal pulse of a predetermined pulse width in response to a first received one of said electrical signals from said selected sensor means, said delay circuit means not producing further pulse signals until the end of the delay signal pulse of predetermined pulse width followed by the receipt of a subsequent one of said electrical signals, and wherein said second pulse signal producing circuit includes one shot circuit means also coupled to said selected one of said sensor means for producing a one shot signal pulse of variable pulse width in response to each and every one of the electrical signals received from said selected one of said sensor means.

13. A monitoring circuit for use with a seed monitoring apparatus including a seed sensor comprising a housing forming a path of travel for seeds and a plurality of seed sensing devices mounted on said housing each for detecting the passage of seeds through a predetermined associated portion of the path of travel and for emitting an electrical signal in response to each seed detected, said monitoring circuit comprising: means responsive to said electrical signals for producing one or more pulse signals and means for controlling the number of pulse signals produced in a predetermined fashion in accordance with which one or ones of said plurality of seed sensing devices produce an electrical signal in response to each seed and wherein said controlling means includes means responsive to ones of said electrical signals occurring within a predetermined time interval from two predetermined ones of said plurality of seed sensing devices for producing a predetermined number of additional pulse signals and means for adding the additional pulse signals to other ones of the pulse signals produced by the pulse signal producing means.

* * * * *